United States Patent
Foley et al.

(10) Patent No.: US 10,763,528 B2
(45) Date of Patent: Sep. 1, 2020

(54) OPERATION OF A FUEL CELL STACK TO PREVENT LOW OXYGEN CONCENTRATIONS IN A SURROUNDING ENCLOSED SPACE

(71) Applicant: GM GLOBAL TECHNOLOGY OPERATIONS LLC, Detroit, MI (US)

(72) Inventors: Robert S. Foley, Rochester, NY (US); Jeffrey J. Gagliardo, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 15/707,201

(22) Filed: Sep. 18, 2017

(65) Prior Publication Data

US 2019/0088963 A1    Mar. 21, 2019

(51) Int. Cl.
*H01M 8/04992* (2016.01)
*B60L 58/30* (2019.01)
*H01M 8/0444* (2016.01)
*H01M 8/043* (2016.01)
*H01M 8/04302* (2016.01)

(52) U.S. Cl.
CPC ......... *H01M 8/04992* (2013.01); *B60L 58/30* (2019.02); *H01M 8/043* (2016.02); *H01M 8/0444* (2013.01); *H01M 8/04302* (2016.02); *H01M 2250/20* (2013.01)

(58) Field of Classification Search
CPC ............... H01M 8/043; H01M 8/0444; H01M 2250/20; H01M 8/04089; B60L 58/30
See application file for complete search history.

*Primary Examiner* — Ladan Mohaddes
(74) *Attorney, Agent, or Firm* — Reising Ethington P.C.

(57) ABSTRACT

A method of operating a fuel cell stack that powers a vehicle includes determining when the vehicle is in a non-moving state, calculating an $O_2$ concentration over time of an assumed enclosed space while the vehicle is in the non-moving state, establishing a set of $O_2$ concentration concern levels that includes a first $O_2$ concentration concern level being less than a standard atmospheric $O_2$ concentration and a second $O_2$ concentration concern level being less than the first $O_2$ concentration concern level, comparing the $O_2$ concentration of the assumed enclosed space over time with the set of $O_2$ concentration concern levels, and operating the fuel cell stack without restriction when the vehicle is in the non-moving state so long as the $O_2$ concentration of the assumed enclosed space remains greater than the first $O_2$ concentration concern level.

20 Claims, 3 Drawing Sheets

OPERATION OF A FUEL CELL STACK TO PREVENT LOW OXYGEN CONCENTRATIONS IN A SURROUNDING ENCLOSED SPACE

INTRODUCTION

The present disclosure relates to operating a fuel cell stack (FCS) for a vehicle that may be enclosed by a surrounding structure such as a closed garage or other confined space. More specifically, the present disclosure provides methods to operate the FCS according to a conditional operating mode that assumes the vehicle is in an enclosed space when certain operating conditions of the vehicle are met. The conditional operating mode is designed so that, if the vehicle is actually contained within an enclosed space, the operation of the FCS will be modified so that the FCS does not overly deplete the available oxygen within that space beyond an acceptable level. The conditional operating mode also seeks to avoid unnecessary modifications to the operation of the FCS when the vehicle is not actually in an enclosed space but, nonetheless, the conditional operating mode is triggered.

A proton-exchange membrane (PEM) fuel cell is an electro-chemical device that includes a membrane-electrode-assembly having an anode catalyst layer and a cathode catalyst layer disposed on opposite sides of a proton-conducting solid polymer electrolyte. The anode catalyst layer receives hydrogen gas and the cathode catalyst layer receives oxygen or air. The hydrogen gas is dissociated at the anode catalyst layer to generate free protons and electrons. The protons migrate through the electrolyte and the electrons are directed through a load to perform work. The protons and electrode eventually reach the cathode catalyst layer where they react with oxygen to generate water. A FCS includes a plurality of similar PEM fuel cells that are separated by bipolar plates and connected to common supplies of hydrogen gas and oxygen or air.

The cathode catalyst layers of the FCS are supplied with oxygen from the surrounding ambient environment and consume that oxygen as needed to support the on-going operation of the FCS. If the vehicle is in an enclosed space when the FCS is running—such as when the vehicle is running in a closed garage to heat the passenger compartment—the amount of available oxygen within the enclosed space may be depleted faster than it can be replenished by the exchange of air from outside the enclosed space to inside the enclosed space. As such, under these circumstances, the oxygen concentration within the enclosed space may begin to drop. A conditional operating mode for a FCS is therefore needed that can address the issue of a falling oxygen concentration within an enclosed space whenever certain operating conditions of the vehicle suggest that the vehicle could be in an enclosed space without, of course, unnecessarily disrupting operation of the FCS when the vehicle is assumed to be, but is not actually in, such an enclosed space.

SUMMARY

A method of operating a fuel cell stack according to one embodiment may include several steps. One step involves determining when a vehicle that is powered by the fuel cell stack is in a non-moving state. In another step, an $O_2$ concentration of an assumed enclosed space is calculated over time while the vehicle is in the non-moving state. In yet another step, a set of $O_2$ concentration concern levels is established that includes a first $O_2$ concentration concern level being less than a standard atmospheric $O_2$ concentration and a second $O_2$ concentration concern level being less than the first $O_2$ concentration concern level. In still another step, the fuel cell stack is operated without restriction when the vehicle is in the non-moving state so long as the $O_2$ concentration of the assumed enclosed space remains greater than the first $O_2$ concentration concern level.

The method of the aforementioned embodiment may include several steps or be further defined. For example, the step of determining when the vehicle that is powered by the fuel cell stack is in a non-moving state may include determining that a speed of the vehicle is less than or equal to five kilometers/hour. As another example, the step of determining when the vehicle that is powered by a fuel cell stack is in a non-moving state may include determining that the vehicle is stationary. And, in yet another example, the step of determining when the vehicle that is powered by the fuel cell stack is in a non-moving state may include determining that the vehicle is stationary and that GPS coordinates of the vehicle indicate that the vehicle is not on a road.

Additionally, the step of calculating the $O_2$ concentration of the assumed enclosed space over time may include setting the $O_2$ concentration of the assumed enclosed space at standard atmospheric $O_2$ concentration when the vehicle is first determined to be in the non-moving state and thereafter adjusting the $O_2$ concentration of the assumed enclosed space based on an amount of $O_2$ consumed by the fuel cell stack over time and an amount of $O_2$ replenished to the assumed enclosed space over time. The amount of $O_2$ consumed by the fuel cell stack may include an amount of $O_2$ consumed due to generating a current of the fuel cell stack, an amount of $O_2$ consumed due to cathode catalytic heating (CCH), and an amount of $O_2$ consumed due to stack voltage recovery (SVR), and the amount of $O_2$ replenished to the enclosed space may be based on 0.03 air exchanges/hour.

Still further, the first $O_2$ concentration concern level may be less than 21 mol % and greater than 19 mol % and, separately, the second $O_2$ concentration concern level may be less than 20 mol % and greater than 18 mol %. More narrowly, the first $O_2$ concentration concern level may be 20 mol % and the second $O_2$ concentration concern level may be 19 mol %.

The step of operating the fuel cell stack without restriction in the aforementioned method may include operating the fuel cell stack with CCH and SVR processes enabled. Moreover, the aforementioned method may further comprise the additional step of operating the FCS in a low-power state when the $O_2$ concentration of the assumed enclosed space is equal to or less than the first $O_2$ concentration concern level yet greater than the second $O_2$ concentration concern level. The aforementioned method may also further comprise the step of shutting down the fuel cell stack when the $O_2$ concentration of the assumed enclosed space is equal to or less than the second $O_2$ concentration concern level.

A method of operating a fuel cell stack according to another embodiment may include several steps. One step involves determining when a vehicle that is powered by the fuel cell stack is in a non-moving state. In another step, an $O_2$ concentration of an assumed enclosed space is calculated over time while the vehicle is in the non-moving state. In yet another step, the $O_2$ concentration of the assumed enclosed space is compared over time with a set of $O_2$ concentration concern levels that includes a first $O_2$ concentration concern level and a second $O_2$ concentration concern level. The first $O_2$ concentration concern level is less than a standard atmospheric $O_2$ concentration and the second $O_2$ concentration concern level is less than the first $O_2$ concentration concern level. In still another step, the fuel cell stack is operated when the vehicle is in the non-moving state according to a conditional operating mode. The conditional operating mode includes (1) operating the fuel cell stack without restriction so long as the $O_2$ concentration of the assumed enclosed space remains greater than the first $O_2$ concentration concern level; (2) operating the fuel cell stack in a low-power state when the $O_2$ concentration of the assumed enclosed space is equal to or less than the first $O_2$ concentration concern level yet greater than the second $O_2$ concentration concern level; and (3) shutting down the fuel cell stack when the $O_2$ concentration of the assumed enclosed space is equal to or less than the second $O_2$ concentration concern level.

The method of the aforementioned embodiment may include several steps or be further defined. For example, the step of determining when the vehicle that is powered by the fuel cell stack is in a non-moving state may include determining that the vehicle is stationary. As another step, the step of determining when the vehicle that is powered by the fuel cell stack is in a non-moving state may include determining that the vehicle is stationary and that GPS coordinates of the vehicle indicate that the vehicle is not on a road.

Additionally, the step of calculating the $O_2$ concentration of the assumed enclosed space over time includes setting the $O_2$ concentration of the assumed enclosed space at standard atmospheric $O_2$ concentration when the vehicle is first determined to be in a non-moving state and thereafter adjusting the $O_2$ concentration of the assumed enclosed space based on an amount of $O_2$ consumed by the fuel cell stack over time and an amount of $O_2$ replenished to the assumed enclosed space over time. The amount of $O_2$ consumed by the fuel cell stack includes an amount of $O_2$ consumed due to generating a current of the fuel cell stack, an amount of $O_2$ consumed due to cathode catalytic heating (CCH), and an amount of $O_2$ consumed due to SVR, and the amount of $O_2$ replenished to the enclosed space is based on 0.03 air exchanges/hour Still further, the first $O_2$ concentration concern level may be less than 21 mol % and greater than 19 mol %, and the second $O_2$ concentration concern level may be less than 20 mol % and greater than 18 mol %. Moreover, the step of operating the fuel cell stack in the low-power state may include disabling CCH and SVR of the fuel cell stack.

A method of operating a fuel cell stack according to yet another embodiment may include several steps. One step involves determining when a vehicle that is powered by a fuel cell stack is in a non-moving state. In another step, an $O_2$ concentration of an assumed enclosed space that encompasses the vehicle is calculated over time while the vehicle is in the non-moving state. In yet another step, the $O_2$ concentration of the assumed enclosed space is compared over time with a set of $O_2$ concentration concern levels that includes a first $O_2$ concentration concern level and a second $O_2$ concentration concern level. The first $O_2$ concentration concern level is less than 21 mol % and greater than 19 mol % and the second $O_2$ concentration concern level is less than 20 mol % and greater than 18 mol %. In another step, the fuel cell stack is operated when the vehicle is in the non-moving state according to a conditional operating mode. The conditional operating mode includes (1) operating the fuel cell stack without restriction so long as the $O_2$ concentration of the assumed enclosed space remains greater than the first $O_2$ concentration concern level; (2) idling the fuel cell stack when the $O_2$ concentration of the assumed enclosed space is equal to or less than the first $O_2$ concentration concern level yet greater than the second $O_2$ concentration concern level; and (3) shutting down the fuel cell stack when the $O_2$ concentration of the assumed enclosed space is equal to or less than the second $O_2$ concentration concern level.

DETAILED DESCRIPTION

Hydrogen is an attractive fuel for operating a vehicle because it is clean and can be used to efficiently produce electricity in a fuel cell. A number of individual PEM fuel cells that consume hydrogen as part of an electro-chemical reaction that produces electrical current are typically combined in a fuel cell stack (FCS) to generate the desired power for operating a vehicle. For example, a typical FCS for a vehicle may have two hundred or more stacked PEM fuel cells. The FCS typically receives a flow of hydrogen gas and a flow of an oxidant gas such as air or oxygen, and then distributes each of those reactant gasses to the anode catalyst layers and the cathode catalyst layers, respectively, of the various PEM fuel cells by way of bipolar plates that separate the PEM fuel cells. The FCS thus consumes both hydrogen and oxygen during normal operation.

In some types of enclosed spaces (e.g., a garage), oxygen from the air in the local environment may be consumed by the FCS faster than it is replenished. To address this issue, a method that includes a conditional operating mode of the

Figure 1:
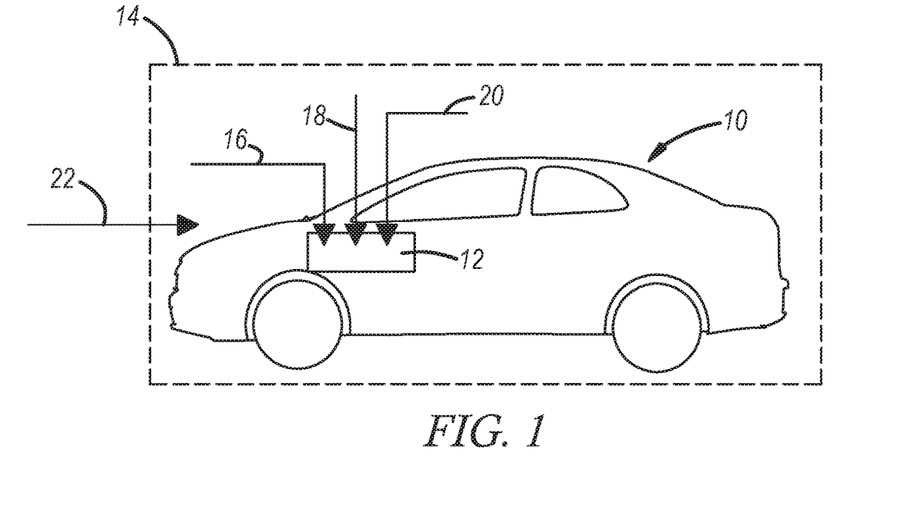
FIG. 1 is a schematic illustration of a fuel cell stack encompassed by an assumed enclosed space that shows various oxygen consumption processes and an oxygen replenishment process that can be used to compute a calculated $O_2$ concentration of the assumed enclosed space over time according to practices of the present disclosure.

FCS may be implemented when a vehicle 10 that is powered by a FCS 12 is in a non-moving state, as shown schematically in FIG. 1. Specifically, and as shown in the diagram of FIG. 1, the conditional operating mode calls for the vehicle 10 to be treated as if it is contained within an enclosed spaced, referred to herein as an "assumed enclosed space" and identified by reference numeral 14, whenever the vehicle 10 is determined to be in a non-moving state. The assumed enclosed space 14 is thus a virtual enclosure having a volume that may or may not be large enough to encompass the vehicle 10. This space 14 is used to model the amount of $O_2$ in the volume of the assumed enclosed space 14 based on the operation of the FCS 12 and the pressure and temperature of the assumed enclosed space 14, which can be estimated, measured, or simply assigned. In that regard, the assumed enclosed space 14 and the calculated amount of $O_2$ within that space 14 is designed to conservatively model what would happen if the vehicle 10 is actually contained within an enclosed space, such as a garage, even though it may not always be, and to take responsive action based on the $O_2$ concentration calculated within the assumed enclosed space 14 to help ensure that the $O_2$ concentration in an actual enclosed space is not excessively depleted.

FIG. 1 schematically illustrates how oxygen may be consumed and replenished in the assumed enclosed space 14, which may be designed to be just large enough to surround the vehicle 10 in accordance with the definition of a "small garage" as set forth in SAE J 2578, 3rd Edition (August 2014). The SAE J 2578, 3rd Edition (August 2014) ("the SAE J 2578 standard") is incorporated herein by reference in its entirety. The size and volume of the assumed enclosed space 14 may vary depending on the size of the vehicle 10. Other standards (e.g., ISO standard, JIS standard, local regulation, etc.) may also be used in lieu of the SAE J 2578 standard to define the size of the assumed enclosed space 14, if desired, or the assumed enclosed space 14 may be an approximation of an actual surrounding enclosure whose dimensions can be assessed and estimated using vision systems or LIDAR. Still further, the assumed enclosed space 14 may simply be predefined. In many instances, however, regardless of how the assumed enclosed space 14 and its volume are ascertained, the assumed enclosed space 14 may have a volume that ranges from 5 m³ to 200 m³ or, more narrowly, from 20 m³ to 50 m³. Additionally, to allow for the amount and concentration of $O_2$ to be modeled within the assumed enclosed space 14, a temperature and pressure within the space 14 may be calibrated based on measured ambient atmospheric conditions, or those may be assigned. For instance, in one implementation, the temperature and pressure of the assumed enclosed space may be selected to be 60° C. and 1 atmosphere for simplification.

When the vehicle 10 containing the FCS 12 is in the non-moving state, the FCS 12 may consume oxygen in several ways, which can reduce the $O_2$ concentration in the assumed enclosed space 14. In a first process 16, the FCS 12 consumes $O_2$ from the volume of the assumed enclosed space 14 while simultaneously consuming $H_2$ to generate an electric current. The general cathode half-reaction for consuming $O_2$ and generating water, the general anode half-reaction for consuming $H_2$ and generating a flow of electrons, and the overall reaction of the fuel cells in the FCS 12 are depicted below:

Anode:

Cathode:

Overall:

To that end, the molar flow of $O_2$ ($\dot{n}_{O2}$) required to support the production of a given electrical current (I) by the FCS 12 for operation of the various vehicle systems can be calculated continuously with time while the vehicle 10 is in the non-moving state through the following equation:

$$\dot{n}_{O2} = \frac{I * N_{CELL}}{4 * F}$$

I:         Stack current $N_{CELL}$:   Number of cells in the stack 4:         Number of electrons per $O_2$ molecule F:        Faraday's Constant, 96485 C/mole In a second process 18, the FCS 12 consumes $O_2$ from the volume of the assumed enclosed space 14 to support cathode catalytic heating (CCH) of the FCS 12. During CCH, $H_2$ is routed around the polymer electrolytes and delivered to the cathode catalyst layers of the FCS 12 along with $O_2$ to facilitate the combustion of the $H_2$. The heat generated at the cathode catalyst layers as a result of combusting $H_2$ is then used to heat the FCS 12 to its optimal operating temperature range and to also heat the passenger cabin of the vehicle 10, if desired. CCH is thus useful when starting the vehicle 10, especially at cold or freezing temperatures after the vehicle 10 has been in a non-operational state for an extended period. The molar flow rate of $O_2$ ($\dot{n}_{O2}$) required to support CCH can be calculated continuously with time while the vehicle 10 is in the non-moving state through the following equation:

$$\dot{n}_{O2} = \frac{Q * 0.5}{LHV_{H2}}$$

Q:        Heat production $LHV_{L2}$:   Lower heating value of hydrogen (242 kJ/mol)

0.5:      Number of $O_2$ molecules per $H_2$ molecules In a third process 20, the FCS 12 consumes $O_2$ from the volume of the assumed enclosed space 14 to support stack voltage recovery (SVR) of the FCS 12. During SVR operation, the FCS 12 runs with a low voltage in order to remove contaminant build up and/or impurities from the catalyst layers and/or the solid polymer electrolytes within the stack (e.g., sulfate build-up). Subsequently, water washes away the contaminants. A SVR cycle is commonly implemented during vehicle start up, and the molar flow of $O_2$ ($\dot{n}_{O2}$) required to support a SVR cycle can be calculated continuously with time while the vehicle 10 is in the non-moving using the same equation as set forth above for drawing electrical current (I).

Other factors may also influence the amount of $O_2$ present within the assumed enclosed space 14 besides the direct consumption of $O_2$. For example, in some cases, the $O_2$ concentration in the assumed enclosed space 14 can be further reduced based on the output of unreacted $H_2$ from the FCS 12, which can dilute the $O_2$ and lower its concentration. The effect of $O_2$ dilution is generally negligible when compared to the direct consumption of $O_2$ through stack current generation, CCH, and SVR, and for that reason it can usually be ignored when calculating the $O_2$ of the assumed enclosed space 14 over time, although provisions can be made to take $O_2$ dilution into account if desired as part of the overall method.

The assumed enclosed space 14 is also replenished by air at an air/exchange rate 22 from outside of the assumed enclosed space 14. The air/exchange rate 22 may be set to any value to adjust the modeling of the $O_2$ concentration within the assumed enclosed space 14 as desired. In one embodiment, according to the incorporated SAE J 2578 standard, the air/exchange rate 22 may be 0.03 air exchanges/hour, meaning that 3% of the air by volume in a designated space is replenished each hour. Of course, the air/exchange rate 22 is calibratable and may be set higher or lower than 0.03 air exchanges/hour. By knowing the volume, temperature, pressure, and original $O_2$ concentration of the assumed enclosed space 14, as well as the amount of $O_2$ consumed by processes 16, 18, 20 and replenished by the air/exchange rate 22, the amount and concentration of $O_2$ in the assumed enclosed space 14 can be calculated or modeled over time during the time the vehicle 10 is in the non-moving state and the FCS 12 is operating using the Ideal Gas Law or some other appropriate equation or algorithm. This information can be used to inform the conditional operating mode of the FCS 12 and to trigger certain actions with respect to the operation of the FCS 12 when the modeled $O_2$ concentration of the assumed enclosed space 14 eclipses certain predetermined $O_2$ concentration concern levels.

Figure 2:
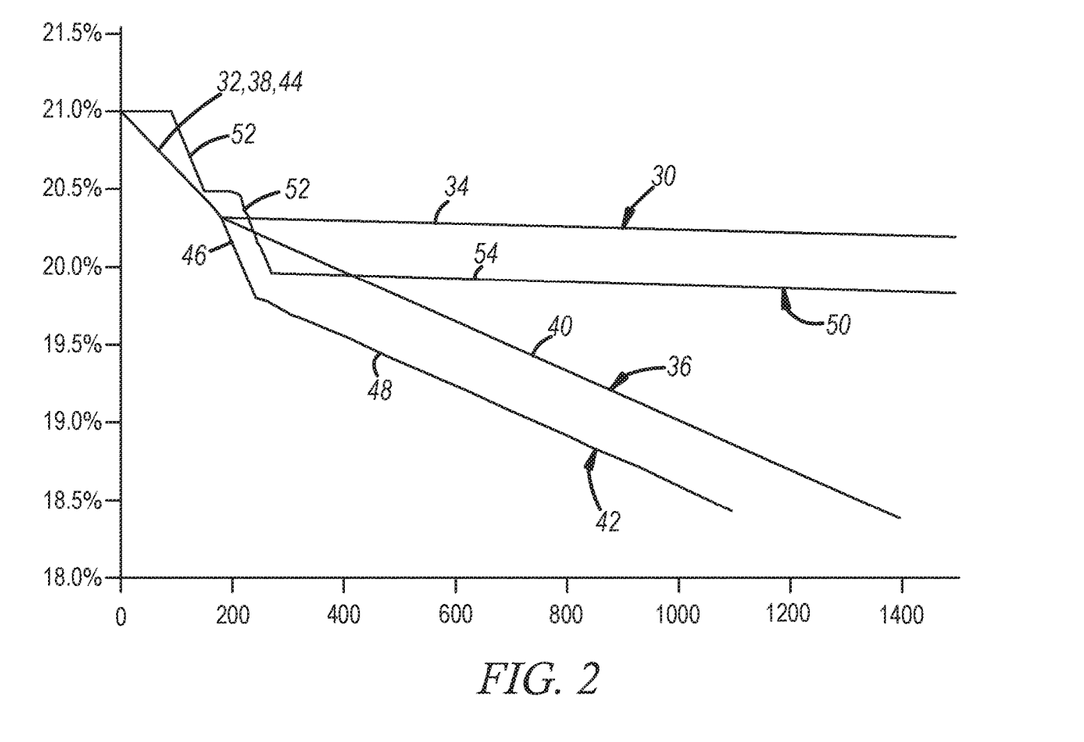
FIG. 2 is a graph that depicts four different scenarios in which the operation of a fuel cell stack may affect the calculated $O_2$ concentration of the assumed enclosed space according to practices of the present disclosure, wherein the y-axis is the calculated $O_2$ concentration in mole percentage and the x-axis is time in seconds.

With reference, for the moment, to FIG. 2, a graph is shown in which several different operating scenarios of the FCS 12 are depicted with the y-axis representing a calculated $O_2$ concentration in mole percentage of the assumed enclosed space 14 and the x-axis representing time in seconds. The volume of assumed enclosed space 14 is that established in the SAE J 2578 standard. Additionally, the air/exchange rate 22 is set at 0.03 air exchanges/hour, the temperature and pressure within the assumed enclosed space 14 is set to be 60° C. and 1 atmosphere, respectively, and the $O_2$ concentration of the assumed enclosed space 14 is set at the standard atmospheric $O_2$ concentration of 21 mol % at the time the vehicle 10 that includes the FCS 12 is first determined to be in the non-moving state. Each of the current generating process 16, the CCH process 18, and the SVR process 20 are deemed to consume $O_2$ from the assumed enclosed space 14 as described above. The graph here is meant to show how certain operating scenarios of the FCS 12 can deplete the modeled $O_2$ concentration within the assumed enclosed space 14 and how quickly such depletion can occur.

Four specific operating scenarios of the FCS 12 are illustrated in FIG. 2. In a first scenario, identified by reference numeral 30, a 200 second warm-up cycle 32 is performed using the CCH process 18, followed by an idle period 34 of greater than 1200 seconds without running the CCH or SVR processes 18, 20. In this scenario 30, the $O_2$ concentration of the assumed enclosed space 14 dropped by approximately 0.7 mol % during the warm-up cycle 32, but then decreased only slightly by another 0.1 mol % to 0.2 mol % over the lengthier idle period 34. In a second scenario, identified by reference numeral 36, a 200 second warm-up cycle 38 is performed in the same way as the first scenario 30, followed by an idle period 40 of 1200 seconds in which the CCH process 18 was used to provide 8 kW of cabin heating. In this scenario 36, after 1400 seconds, the $O_2$ concentration of the assumed enclosed space 14 dropped by over 2.5 mol %.

In a third scenario, identified by reference numeral 42, a 200 second warm-up cycle 44 is performed in the same way as the first and second scenarios 30, 36, followed by a 30 second SVR cycle 46 and then an idle period 48 of 820 seconds in which the CCH process 18 was used to provide 8 kW of cabin heating. Here, after 1100 seconds, $O_2$ concentration of the assumed enclosed space 14 dropped by over 3.0 mol %. Finally, in a fourth scenario, identified by reference numeral 50, two 30 second SVR cycles 52 are performed followed by an idle period 54 of greater than 1100 seconds without running the CCH or SVR processes 18, 20. In this scenario 50, the $O_2$ concentration of the assumed enclosed space 14 dropped by approximately 0.5 mol % during each SVR cycle 20, but then decreased only slightly by another 0.1 mol % to 0.2 mol % over the lengthier idle period 54.

In light of the various ways the FCS 12 may consume $O_2$ and actually affect the $O_2$ concentration within the assumed enclosed space 14 over time, the conditional operating mode relies on a set of programmed $O_2$ concentration concern levels to ensure that the calculated $O_2$ concentration of the space 14 does not drop too excessively. But first, in order to trigger the conditional operating mode, the vehicle 10 that is powered by the FCS 12 is first determined to be in a non-moving state. This can be accomplished by observing certain available parameters of the vehicle 10, including its speed and/or location (using GPS coordinates), as well as utilizing proximity sensor(s), vision systems, and/or LIDAR to observe the surroundings of the vehicle 10, to name a few options. After determining that the vehicle is in the non-moving state, an $O_2$ concentration of the assumed enclosed space 14 is calculated over time, as discussed above in connection with FIGS. 1-2, while the vehicle 10 is in the non-moving state. The calculated $O_2$ concentration of the assumed enclosed space 14 is then compared over time to a set of established $O_2$ concentration concern levels. Based on this ongoing comparison, the conditional operating mode may restrict certain operations of the FCS 12, as will be further explained below.

Determining whether the vehicle 10 is in a non-moving state can be carried out by considering the speed of the vehicle 10. For example, and referring now to FIG. 3, one approach 60 for determining when the vehicle 10 is in a non-moving state is shown in a flow diagram. The approach 60 starts in box 62. In box 64, the approach 60 involves determining whether the vehicle is moving at a speed indicative of a non-moving state. In one embodiment, a speed of less than or equal to 5 kilometers/hour may be programmed to be indicative of a non-moving state. In another narrower embodiment, the vehicle 10 may only be considered to be in a non-moving state when the vehicle is stationary (i.e., a speed of 0 kilometers/hour). If the speed condition for a non-moving state is not met, the approach 60 proceeds through arrow 66 to box 68 where the vehicle 10 is determined to not be a non-moving state and the conditional operating mode is therefore not initiated. If the speed condition for a non-moving state is met, the approach proceeds through arrow 70 to box 72 where the vehicle 10 is determined to be in a non-moving state and the conditional operating approach is initiated until the vehicle 10 in no longer in the non-moving state.

Figure 3:
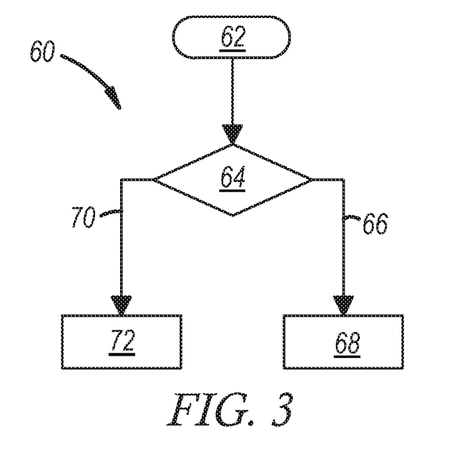
FIG. 3 is a flow diagram that depicts one approach for determining whether a vehicle is in a non-moving state according to practices of the present disclosure.
Figure 4:
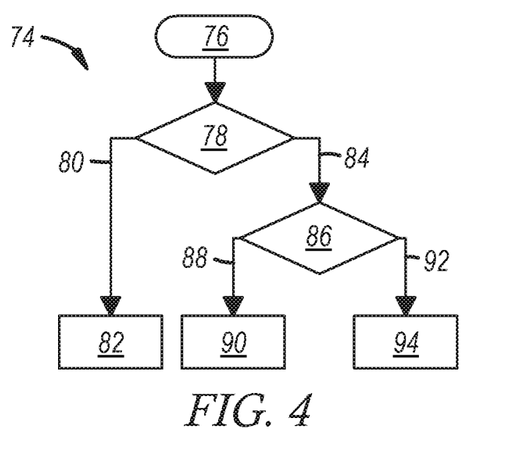
FIG. 4 is a flow diagram that depicts another approach for determining whether a vehicle is in a non-moving state according to practices of the present disclosure.

Another more robust approach 74 for determining when the vehicle 10 is in a non-moving state, which is shown in FIG. 4 as a flow diagram, may be carried out by considering the speed and position of the vehicle 10. This approach starts in box 76. In box 78, the approach involves determining whether the vehicle is moving at a speed indicative of a non-moving state in the same way as previously described in connection with FIG. 3. If the speed condition for a non-moving state is not met, the approach 74 proceeds through arrow 80 to box 82 where the vehicle 10 is determined to not be a non-moving state and the conditional operating mode is therefore not initiated. If, however, the speed condition for a non-moving state is met, the approach 74 proceeds through arrow 84 to box 86 where GPS coordinates of the vehicle 10 are referenced to ascertain whether the vehicle 10 is on a road (e.g., a highway). If the vehicle 10 is on a road, the approach proceeds through arrow 88 to box 90 where the vehicle 10 is determined to not be a non-moving state and the conditional operating mode is therefore not initiated. If the vehicle 10 is not on a road, the approach proceeds through arrow 92 to box 94 where the vehicle 10 is determined to be in a non-moving state and the conditional operating approach is initiated until the vehicle 10 in no longer in the non-moving state.

If the vehicle is determined to be in a non-moving state by either approach 60, 74 described above, or some other approach, the $O_2$ concentration of the assumed enclosed space 14 is calculated over time while the vehicle 10 remains in the non-moving state. This may entail initially setting the $O_2$ concentration of the assumed enclosed space 14 at the standard atmospheric $O_2$ concentration of 21 mol % at the time the vehicle 10 that includes the FCS 12 is first determined to be in the non-moving state and then adjusting the $O_2$ concentration of the assumed enclosed space 14 based on the amount of $O_2$ consumed by the FCS 12 over time and the amount of $O_2$ replenished to the assumed enclosed space 14 over time. The amount of $O_2$ consumed by the FCS 12 over time and an amount of $O_2$ replenished to the assumed enclosed space 14 over time can be easily calculated using the $O_2$ consumption processes 16, 18, 20 and the air/exchange rate 22 discussed above, respectively, in connection with FIGS. 1-2. And by additionally knowing the volume, temperature, and pressure of assumed enclosed space 14—each of which can be specified in a variety of ways as explained above—the $O_2$ concentration within the assumed enclosed space 14 can be continuously calculated.

Figure 5:
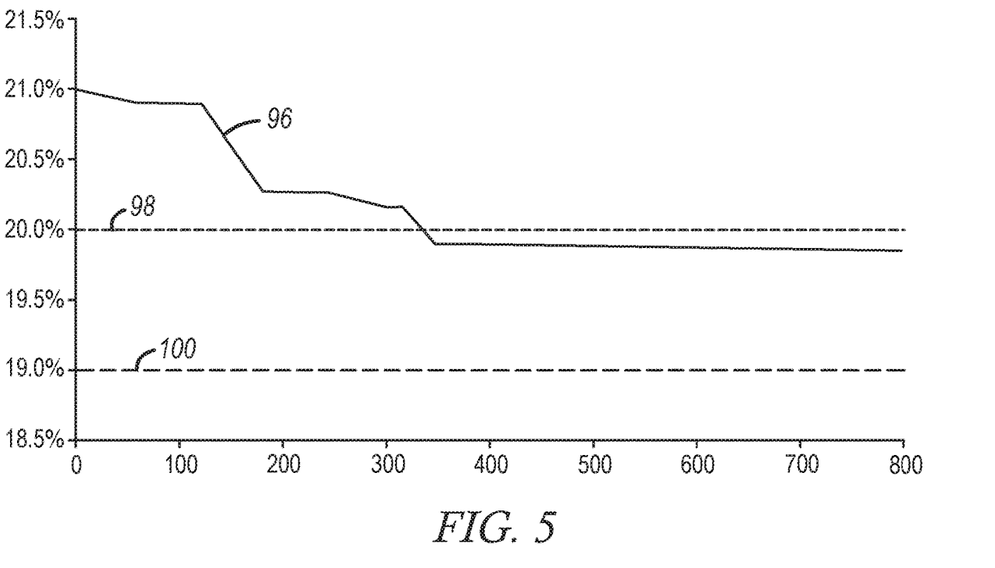
FIG. 5 is a graph that plots the calculated $O_2$ concentration within the assumed enclosed space over time for comparison of the calculated $O_2$ concentration against a set of established $O_2$ concentration concern levels so long as the vehicle remains in the non-moving state according to practices of the present disclosure, wherein the y-axis is the calculated $O_2$ concentration in mole percentage and the x-axis is time in seconds.

Referring now to FIG. 5, the calculated $O_2$ concentration within the assumed enclosed space 14 is compared over time against a set of established $O_2$ concentration concern levels so long as the vehicle 10 remains in the non-moving state. Here, in this figure, the calculated $O_2$ concentration (y-axis) is identified by reference numeral 96 and is plotted against time in seconds (x-axis). The set of $O_2$ concentration concern levels are also shown in this figure and includes a first $O_2$ concentration concern level 98 and a second $O_2$ concentration concern level 100. The first $O_2$ concentration concern level 98 is less than the standard atmospheric $O_2$ concentration (i.e., less than 21%) and the second $O_2$ concentration concern level 100 is less than the first $O_2$ concentration concern level 98. For example, the first $O_2$ concentration concern level 98 may be less than 21 mol % and greater than 19 mol %, and the second $O_2$ concentration concern level 100 may be less than 20 mol % and greater than 18 mol %. In one particular example, as shown, the first $O_2$ concentration concern level 98 may be set at 20 mol % and the second $O_2$ concentration concern level 100 may be set at 19 mol %.

The conditional operating mode of the FCS 12 performs its function based on the comparison of the calculated $O_2$ concentration 96 within the assumed enclosed space 14 against the set of established $O_2$ concentration concern levels. So long as the calculated $O_2$ concentration 96 within the assumed enclosed space 14 remains above the first $O_2$ concentration concern level 98, which is the case between 0 seconds and approximately 340 seconds in FIG. 5, the FCS 12 can operate without restriction, meaning that all of its oxygen consuming processes 16, 18, 20 are enabled and can be operated as called-upon either individually or in combination to support the demands of the vehicle 10. In particular, the the current generating process 16 can run supply any necessary current (I) required by the vehicle 10, warm-up and cabin heating as enabled by the CCH process 18 can be performed, and cycles of the SVR process 20 can be conducted however desired.

If at some point the calculated $O_2$ concentration 96 reaches the first $O_2$ concentration concern level 98, which occurs at approximately 340 seconds in FIG. 5, the FCS 12 is restricted to operating in a low-power state in which the FCS 12 outputs no more than 15% of its maximum power output in order to slow the rate at which the calculated $O_2$ concentration 96 is dropping. This may entail restricting the FCS 12 to a maximum power output of 8 kW. In one particular example of a low-power state, the FCS 12 may be idled. When idled, the FCS 12 supplies current (I) to power its associated prime mover, typically an electric motor that may or may not be coupled to an internal combustion engine, and its accessories without any applied loads. Essentially, the current generating process 16 is operational so that the FCS 12 can supply enough current (I) to power the prime mover while the prime mover is not coupled to the drivetrain and the foot pedal is not depressed. Each of the CCH process 18 and the SVR process 20 may also be disabled. Running the FCS 12 in the low-power state, particular in idle mode with the CCH and SVR processes 18, 20 disabled, results in a fairly constant and minimal reduction in the calculated $O_2$ concentration 96 over time and allows the calculated $O_2$ concentration 96 to remain above the second $O_2$ concentration concern level 100 for an extended period. For example, in the example of FIG. 5, the calculated $O_2$ concentration 96 will not reach the second $O_2$ concentration concern level 100 for approximately another 9,000 seconds (~2.6 hours or 9,350 seconds since the vehicle entered the non-moving state) when the vehicle 10 is idled and the CCH and SVR processes 18, 20 are disabled.

Should the calculated $O_2$ concentration 96 reach the second $O_2$ concentration concern level 100, which occurs at approximately 9,350 seconds in the example of FIG. 5 as mentioned above, the FCS 12 is shut down to halt all of the oxygen consuming processes 16, 18, 20 and thus prevent any further decrease in the calculated $O_2$ concentration 96. In that regard, since only the air/exchange rate 22 is affecting the amount $O_2$ in the assumed enclosed space 14, the calculated $O_2$ concentration 96 should begin to rise until it eventually arrives at the standard atmospheric $O_2$ concentration of 21 mol %. By operating the FCS 12 in a low-power state when the calculated $O_2$ concentration 96 is equal to or less than the first $O_2$ concentration concern level 98, yet greater than the second $O_2$ concentration concern level 100, and shutting down the FCS 12 when the calculated $O_2$ concentration 96 is equal to or less than the second $O_2$ concentration concern level 100, the conditional operating mode of the FCS 12 provides an orderly and controlled procedure for ensuring the FCS 12 will not deplete the available $O_2$ too extensively in an actual enclosed space such as a garage, if and when the vehicle 10 is in such a space, while at the same time not burdening the use of the FCS 12 with nuisance actions when the vehicle 10 is not in an actual enclosed space but is nonetheless in a non-moving state.

Figure 6:
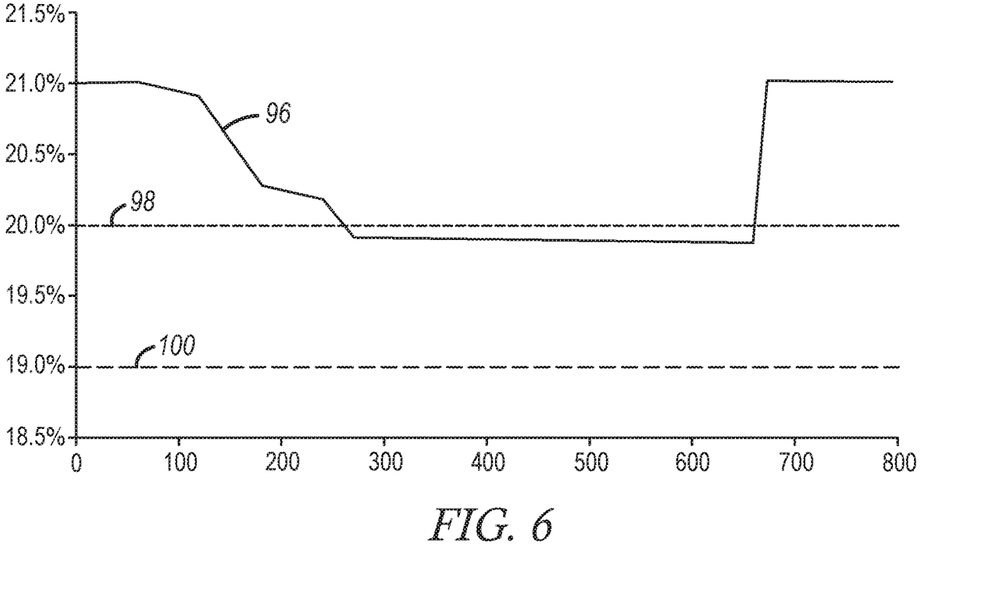
FIG. 6 is also a graph that plots the calculated $O_2$ concentration within the assumed enclosed space over time for comparison of the calculated $O_2$ concentration against a set of established $O_2$ concentration concern levels so long as the vehicle remains in the non-moving state according to practices of the present disclosure, wherein the y-axis is the calculated $O_2$ concentration in mole percentage and the x-axis is time in seconds.

The capacity of the conditional operational mode of the FCS 12 to avoid nuisance actions—most notably unnecessary shut downs of the FCS 12—is demonstrated in FIG. 6. Here, the calculated $O_2$ concentration 96 of the assumed enclosed space 14 is plotted against time in circumstances when the vehicle 10 has been determined to be in a non-moving state, although, in actuality, the vehicle 10 is not parked in an actual enclosed space but instead is stuck in a traffic jam where a shutdown of the FCS 12 is not desired. And since the program that administers the overall method including the conditional operating mode of the FCS 12 may be unable to distinguish between being parked in an actual garage or being stuck in a traffic jam, as the speed of the vehicle 10 in both instances may be 0 km/hour, the FCS 12 is subjected to the conditional operating mode by default even though the rationale behind implementing the conditional operating mode is not present.

As can be seen, and still referring to FIG. 6, the vehicle 10 is determined to be in a non-moving state at about 60 seconds due to traffic congestion, which is more likely to occur if the determination of a non-moving state is based on the speed of the vehicle 10 as described in connection with FIG. 3. The FCS 12 operates without restriction while stuck in traffic form approximately another 190 seconds (just over three minutes) until the calculated $O_2$ concentration 96 of the assumed enclosed space 14 reaches the first $O_2$ concentration concern level 98, which has been set at 20 mol %. At this point, and with the vehicle 10 still in the non-moving state due to traffic congestion, the FCS 12 is restricted to operating in the low-power state, and is preferably idled with the CCH and SVR processes 18, 20 disabled, until such time that the vehicle 10 moves to negate its status as being in a non-moving state, which occurs after about another 400 seconds. Indeed, the idling of the FCS 12 during this 400 second period (just under 7 minutes) slowed the rate of decrease of the calculated $O_2$ concentration 96 to the extent that the FCS 12 was nowhere close to being shut down on account of the calculated $O_2$ concentration 96 reaching the second $O_2$ concentration concern level 100, which has been set at 19 mol %. In fact, the FCS 12 could have idled for at least a few hours before the calculated $O_2$ concentration 96 approached the second $O_2$ concentration concern level 100. Consequently, the use of the first $O_2$ concentration concern level 98 to trigger the restrictive operation of the FCS 12 in the low-power state should prevent nuisance shut down of the FCS 12 as the length of time the FCS 12 can operate in such a state before triggering a shutdown will almost assuredly outlast any amount of time the vehicle 10 may be in a non-moving state due to a traffic jam or otherwise.

The various operations needed to administer the overall method including the conditional operating mode of the FCS stack 12 can be programmed into a standard vehicle electronic control unit or another control system that controls the operation of the vehicle and/or the FCS 12. Such programming, for example, may follow the flow diagram illustrated in FIG. 7. In the illustrated flow diagram, a program that performs the overall method starts in box 102. In box 104, the program calculates the volume of the assumed enclosed space 14 to be used for carrying out the method. Subsequently, the program determines in box 106 if the vehicle 10 is in a non-moving state, as discussed above, for instance, in connection with FIGS. 3-4. If the vehicle 10 is determined not to be in a non-moving state, the program proceeds through arrow 108 to box 110. In box 110, the program resets the $O_2$ concentration of the assumed enclosed space 14 to the standard atmospheric concentration of 21 mol %, thus avoiding the conditional operating mode, and then cycles through boxes 106 and 110 until the vehicle 10 is determined to be in a non-moving state.

Figure 7:
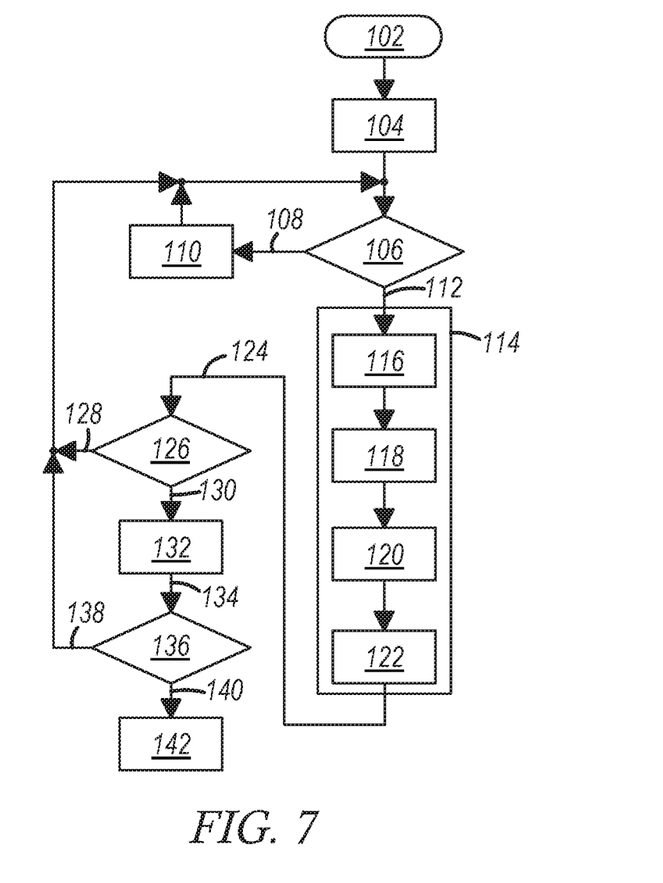
FIG. 7 is a flow diagram illustrating how the disclosed method including the conditional operating mode of the fuel cell stack may be performed by the vehicle.

If the vehicle 10 is determined to be in a non-moving state in box 106, the program follows arrow 112 to box 114 where the calculated $O_2$ concentration 96 of the assumed enclosed space 14 is computed based on a series of sub-calculations including calculating the consumption of $O_2$ in the assumed enclosed space 14 due to the current generating process 16, box 116, calculating the consumption of $O_2$ in the assumed enclosed space 14 due to the CCH process 18, box 118, calculating the consumption of $O_2$ in the assumed enclosed space 14 due to the SVR process 20, box 120, and calculating the replenishment of $O_2$ in the assumed enclosed space 14 due to the air/exchange rate 22, box 122, all of which may be computed using a selected temperature (e.g., 60° C.) and pressure (e.g., 1 atmosphere) of the assumed enclosed space 14 and an initial $O_2$ concentration that equals the standard atmospheric $O_2$ concentration (e.g., 21 mol %). The program then follows arrow 124 to box 126 where the calculated $O_2$ concentration 96 of the assumed enclosed space 14 is compared against the first $O_2$ concentration concern level 98. If the calculated $O_2$ concentration 96 of the assumed enclosed space 14 is greater than the first $O_2$ concentration concern level 98, the program proceeds through arrow 128 and continues to cycle through boxes 106, 114, and 126, thus operating the FCS 12 without restriction, until the program indicates in box 124 that the calculated $O_2$ concentration 96 has reached the first $O_2$ concentration concern level 98.

When the calculated $O_2$ concentration 96 has reached the first $O_2$ concentration concern level 98, as indicated in box 124, the program proceeds through arrow 130 to box 132. In box 132, the FCS 12 operates in a low-power state as described above, which may include idling the FCS 12 and disabling both the CCH process 18 and the SVR process 120. The program then proceeds through arrow 134 to box 136 where the calculated $O_2$ concentration 96 is compared against the second $O_2$ concentration concern level 100. If the calculated $O_2$ concentration 96 of the assumed enclosed space 14 is greater than the second $O_2$ concentration concern level 100, the program proceeds through arrow 138 and continues to cycle through boxes 106, 114, 126, and 136, thus continuing to restrict operation of the FCS 12 to the low-power state, until the program indicates in box 136 that the calculated $O_2$ concentration 96 has reached the second $O_2$ concentration concern level 100. When the calculated $O_2$ concentration 96 has reached the second $O_2$ concentration concern level 100, as indicated in box 136, the program proceeds through arrow 140 to box 142. In box 142, the FCS 12 is shut down. Of course, if the program at any time determines in box 106 that the vehicle 10 is no longer in a non-moving state and the FCS 12 has not been shut down, full unrestricted operation of the FCS 12 is restored and the calculated $O_2$ concentration 96 of the assumed enclosed space 14 is reset to the standard atmospheric concentration of 21 mol %.

The system and method(s) discussed herein provide advantages over simple timing systems that take a particular action (e.g., shut off the FCS) after a set time. Computing the calculated $O_2$ concentration of the assumed enclosed space 14 over time and comparing that value against the set of $O_2$ concentration concern levels 98, 100 corrective actions to be taken with respect to the operation of the FCS 12 that would not be available with a simple countdown-style, timing system. Additionally, a countdown-style, timing system can result in nuisance shutdowns of the FCS 12 that the presently disclosed method can avoid.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of operating a fuel cell stack, the method comprising:
   determining when a vehicle that is powered by the fuel cell stack is in a non-moving state;
   calculating an $O_2$ concentration over time of an assumed enclosed space while the vehicle is in the non-moving state;
   establishing a set of $O_2$ concentration concern levels that includes a first $O_2$ concentration concern level being less than a standard atmospheric $O_2$ concentration and a second $O_2$ concentration concern level being less than the first $O_2$ concentration concern level;
   comparing the $O_2$ concentration of the assumed enclosed space over time with the set of $O_2$ concentration concern levels; and
   operating the fuel cell stack without restriction when the vehicle is in the non-moving state so long as the $O_2$ concentration of the assumed enclosed space remains greater than the first $O_2$ concentration concern level.

2. The method of claim 1, wherein the step of determining when a vehicle that is powered by the fuel cell stack is in a non-moving state includes determining that a speed of the vehicle is less than or equal to five kilometers/hour.

3. The method of claim 2, wherein the step of determining when a vehicle that is powered by the fuel cell stack is in a non-moving state includes determining that the vehicle is stationary.

4. The method of claim 1, wherein the step of determining when a vehicle that is powered by the fuel cell stack is in a non-moving state includes determining that the vehicle is stationary and that GPS coordinates of the vehicle indicate that the vehicle is not on a road.

5. The method of claim 1, wherein the step of calculating an $O_2$ concentration of the assumed enclosed space over time includes setting the $O_2$ concentration of the assumed enclosed space at standard atmospheric $O_2$ concentration when the vehicle is first determined to be in a non-moving state and thereafter adjusting the $O_2$ concentration of the assumed enclosed space based on an amount of $O_2$ consumed by the fuel cell stack over time and an amount of $O_2$ replenished to the assumed enclosed space over time.

6. The method of claim 5, wherein the amount of $O_2$ consumed by the fuel cell stack includes an amount of $O_2$ consumed due to generating a current of the fuel cell stack, an amount of $O_2$ consumed due to cathode catalytic heating (CCH), and an amount of $O_2$ consumed due to stack voltage recovery (SVR), and the amount of $O_2$ replenished to the enclosed space is based on 0.03 air exchanges/hour.

7. The method of claim 1, wherein the first $O_2$ concentration concern level is less than 21 mol % and greater than 19 mol %.

8. The method of claim 1, wherein the second $O_2$ concentration concern level is less than 20 mol % and greater than 18 mol %.

9. The method of claim 1, wherein the first $O_2$ concentration concern level is 20 mol % and the second $O_2$ concentration concern level is 19 mol %.

10. The method of claim 1, wherein the step of operating the fuel cell stack without restriction includes operating the fuel cell stack with CCH and SVR enabled.

11. The method of claim 1, further comprising operating the fuel cell stack in a low-power state when the $O_2$ concentration of the assumed enclosed space is equal to or less than the first $O_2$ concentration concern level yet greater than the second $O_2$ concentration concern level.

12. The method of claim 1, further comprising shutting down the fuel cell stack when the $O_2$ concentration of the assumed enclosed space is equal to or less than the second $O_2$ concentration concern level.

13. A method of operating a fuel cell stack, the method comprising:
   determining when a vehicle that is powered by the fuel cell stack is in a non-moving state;
   calculating an $O_2$ concentration over time of an assumed enclosed space while the vehicle is in the non-moving state;
   comparing the $O_2$ concentration of the assumed enclosed space over time with a set of $O_2$ concentration concern levels that includes a first $O_2$ concentration concern level and a second $O_2$ concentration concern level, the first $O_2$ concentration concern level being less than a standard atmospheric $O_2$ concentration and the second $O_2$ concentration concern level being less than the first $O_2$ concentration concern level; and
   operating the fuel cell stack when the vehicle is in the non-moving state according to a conditional operating mode that includes:
      operating the fuel cell stack without restriction so long as the $O_2$ concentration of the assumed enclosed space remains greater than the first $O_2$ concentration concern level;
      operating the fuel cell stack in a low-power state when the $O_2$ concentration of the assumed enclosed space is equal to or less than the first $O_2$ concentration concern level yet greater than the second $O_2$ concentration concern level; and
      shutting down the fuel cell stack when the $O_2$ concentration of the assumed enclosed space is equal to or less than the second $O_2$ concentration concern level.

14. The method of claim 13, wherein the step of determining when a vehicle that is powered by the fuel cell stack is in a non-moving state includes determining that the vehicle is stationary.

15. The method of claim 13, wherein the step of determining when a vehicle that is powered by the fuel cell stack is in a non-moving state includes determining that the vehicle is stationary and that GPS coordinates of the vehicle indicate that the vehicle is not on a road.

16. The method of claim 13, wherein the step of calculating an $O_2$ concentration of the assumed enclosed space over time includes setting the $O_2$ concentration of the assumed enclosed space at standard atmospheric $O_2$ concentration when the vehicle is first determined to be in a non-moving state and thereafter adjusting the $O_2$ concentration of the assumed enclosed space based on an amount of $O_2$ consumed by the fuel cell stack over time and an amount of $O_2$ replenished to the assumed enclosed space over time.

17. The method of claim 16, wherein the amount of $O_2$ consumed by the fuel cell stack includes an amount of $O_2$ consumed due to generating a current of the fuel cell stack, an amount of $O_2$ consumed due to cathode catalytic heating (CCH), and an amount of $O_2$ consumed due to stack voltage recovery (SVR), and the amount of $O_2$ replenished to the enclosed space is based on 0.03 air exchanges/hour.

18. The method of claim 13, wherein the first $O_2$ concentration concern level is less than 21 mol % and greater than 19 mol %, and wherein the second $O_2$ concentration concern level is less than 20 mol % and greater than 18 mol %.

19. The method of claim 13, wherein the step of operating the fuel cell stack in the low-power state includes disabling CCH and SVR of the fuel cell stack.

20. A method of operating a fuel cell stack, the method comprising:
- determining when a vehicle that is powered by a fuel cell stack is in a non-moving state;
- calculating an $O_2$ concentration over time of an assumed enclosed space that encompasses the vehicle while the vehicle is in the non-moving state;
- comparing the $O_2$ concentration of the assumed enclosed space over time with a set of $O_2$ concentration concern levels that includes a first $O_2$ concentration concern level and a second $O_2$ concentration concern level, the first $O_2$ concentration concern level being less than 21 mol % and greater than 19 mol % and the second $O_2$ concentration concern level being less than 20 mol % and greater than 18 mol %; and
- operating the fuel cell stack when the vehicle is in the non-moving state according to a conditional operating mode that includes:
  - operating the fuel cell stack without restriction so long as the $O_2$ concentration of the assumed enclosed space remains greater than the first $O_2$ concentration concern level;
  - idling the fuel cell stack when the $O_2$ concentration of the assumed enclosed space is equal to or less than the first $O_2$ concentration concern level yet greater than the second $O_2$ concentration concern level; and
  - shutting down the fuel cell stack when the $O_2$ concentration of the assumed enclosed space is equal to or less than the second $O_2$ concentration concern level.

* * * * *